Feb. 14, 1961  W. F. HUCK  2,971,684
SCANNING DEVICE FOR MOVING WEBS
Filed Feb. 28, 1958  4 Sheets-Sheet 1
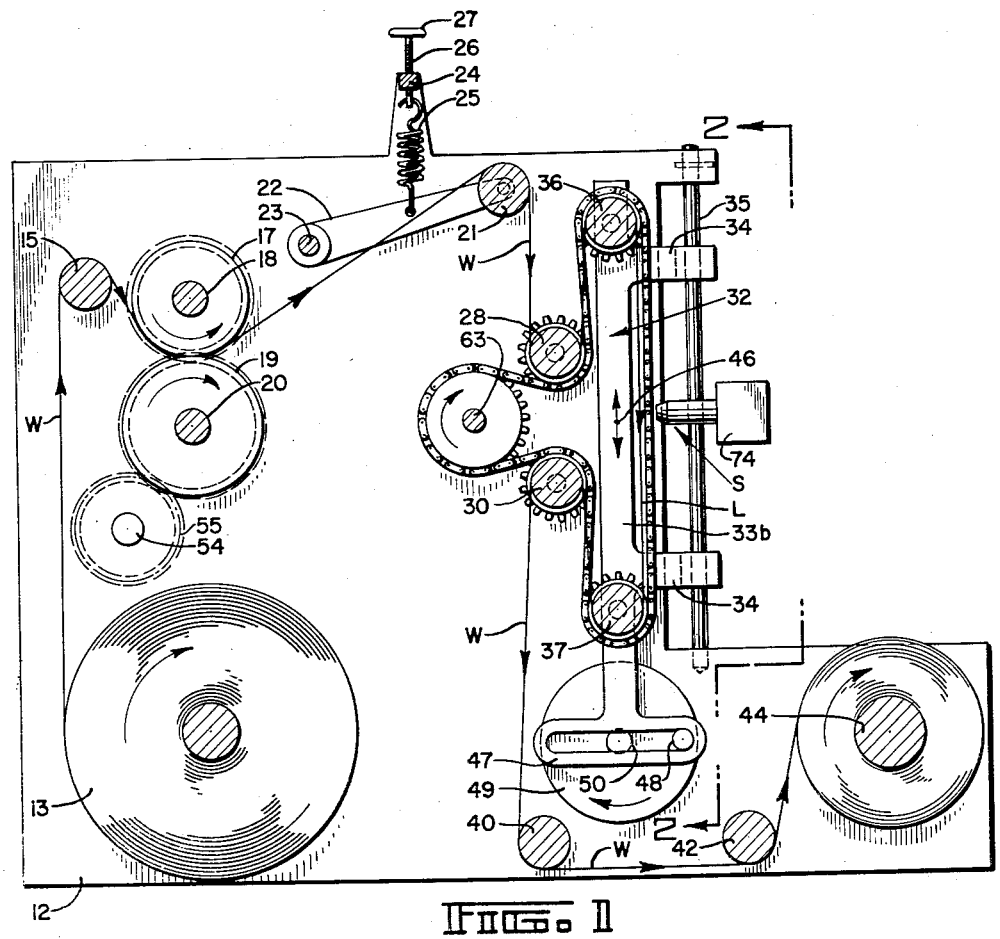
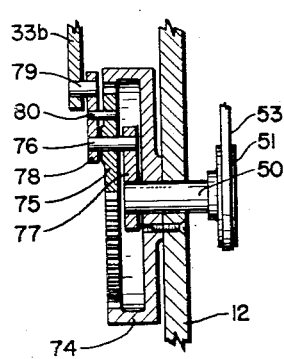
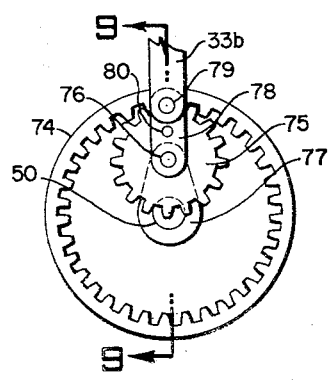
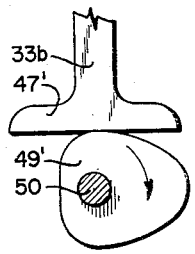
INVENTOR.
WILLIAM F. HUCK
BY
ATTORNEYS.

Feb. 14, 1961 W. F. HUCK 2,971,684
SCANNING DEVICE FOR MOVING WEBS
Filed Feb. 28, 1958 4 Sheets-Sheet 2

INVENTOR.
WILLIAM F. HUCK
BY
ATTORNEYS.

Feb. 14, 1961 W. F. HUCK 2,971,684
SCANNING DEVICE FOR MOVING WEBS
Filed Feb. 28, 1958 4 Sheets-Sheet 4

INVENTOR.
WILLIAM F. HUCK
BY
ATTORNEYS.

United States Patent Office 2,971,684
Patented Feb. 14, 1961

2,971,684

SCANNING DEVICE FOR MOVING WEBS

William F. Huck, Forest Hills, N.Y., assignor to Huck Company, a co-partnership of New York Filed Feb. 28, 1958, Ser. No. 718,324

5 Claims. (Cl. 226—124)

This invention relates generally to a scanning device for moving webs, and more particularly is directed to a device for scanning or viewing the results of a printing or any other process performed on a web which is continuously withdrawn from a roll or other supply thereof and continuously rewound on a take-up roll or the like, following the performance of the printing or other operation. When the printing or other process is performed on the web during relatively slow movement of the latter, the results of the printing or other process may be observed merely by glancing at the slowly moving web. However, it is apparent that, during high speed operations with a correspondingly high speed imparted to the moving web, such direct visual inspection of the web is impossible.

Although a number of devices are presently available which permit inspection of a moving web by either stroboscopic means or by optical means including rotating mirrors, lenses and the like, such devices have proven unsatisfactory for the close inspection of work in which the highest degree of quality must be maintained. Thus, for example, the printing of stamps requires the direct inspection of the latter without the disturbing factors of stroboscopic illumination, observation through remote optical and mechanical means or similar methods, in which even slight mechanical inaccuracies cause disturbing relative motion of the viewed portion of the web or serve to limit the printed, or otherwise processed area, that can be inspected.

Accordingly, it is an object of this invention to provide a scanning device for a moving web which is effective to periodically stop the movement of the web at a scanning station adjacent the path of movement of the latter so that the web, or the results of any printing or other process performed thereon, can be intimately and directly observed at the scanning station, while the web continues its uninterrupted movement along the remainder of its path and while the printing or other process is continuously performed on the web in advance of the scanning station.

In accordance with an aspect of the invention, a mechanical arrangement is provided to periodically decrease the speed of movement of a portion of the web past a scanning station, or to even halt the movement of that portion of the web, thereby to permit direct inspection of the web by an observer at the scanning station, and then to correspondingly increase the speed of movement of the portion of the web at the scanning station, so that the web leaves such mechanical arrangement at the same continuous speed at which it is fed thereto from a printing press or other machine performing a continuous operation on the web. Further, the mechanical arrangement for periodically decreasing and then increasing the speed of movement of the portion of the web at the scanning station is constructed and arranged to avoid excessive stressing of the web by reason of the accelerations and decelerations imparted to the portion thereof at the scanning station.

In accordance with another aspect of the invention, the mechanical arrangement for periodically decreasing and increasing the speed of movement of the web at the scanning station includes two spaced apart rollers having the web passing therebetween and mounted for reciprocation in the direction parallel to the length of the web between such rollers so that, when the rollers move in the direction opposed to the direction of movement of the length of the web between the rollers, the speed of movement of that length of the web in relation to a fixed point, that is, in relation to the scanning station, is correspondingly decreased or reduced to zero while, during the return reciprocating stroke of the rollers in the direction of movement of the length or portion of the web between the rollers, the speed of movement of that length or portion of the web in relation to the fixed scanning station is correspondingly increased. Since the reciprocated rollers turn at accelerated and reduced speeds during the translatory movement of the rollers in opposed directions, respectively, and have relatively large inertia at high rotational speeds, the imposition of large inertial forces on the web resulting from the periodic acceleration and deceleration of the rollers is avoided by providing a mechanical drive system for the rollers which also functions to absorb the previously mentioned inertial forces.

Further, in accordance with an important feature of the invention, the mechanical drive system for the rollers and a mechanism for effecting the reciprocation of the rollers are both driven from a printing couple or other machine acting on the continuously moving web in advance of the scanning station, thereby to ensure that the periodic decreasing and increasing of the speed of movement of the web past the scanning station will be synchronized with the speed at which the web is delivered from the printing couple or other machine acting on the web, and a variable speed transmission is associated with the mechanical drive system for the rollers and responds to the tension in the web in order to maintain a generally constant tension by suitably adjusting the speed of rotation of the rollers so as to compensate for fluctuation in the length or tension of the processed web.

The above, and other objects, features and advantages of the invention, will be apparent in the following detailed description of illustrative embodiments of the invention which is to be read in connection with the accompanying drawings forming a part hereof, and wherein:

Fig. 1 is a longitudinal, vertical sectional view of a scanning device for moving webs in accordance with an embodiment of this invention, as viewed along the line 1—1 of Fig. 2;

Fig. 7 is a fragmentary view of a part of a scanning device for moving webs in accordance with another embodiment of the invention, and corresponding to a portion of Fig. 1;

Fig. 8 is a fragmentary view similar to that of Fig. 7, but showing another embodiment of the invention; and Fig. 9 is a sectional view taken along the line 9—9 of Fig. 8.

Figure 2:
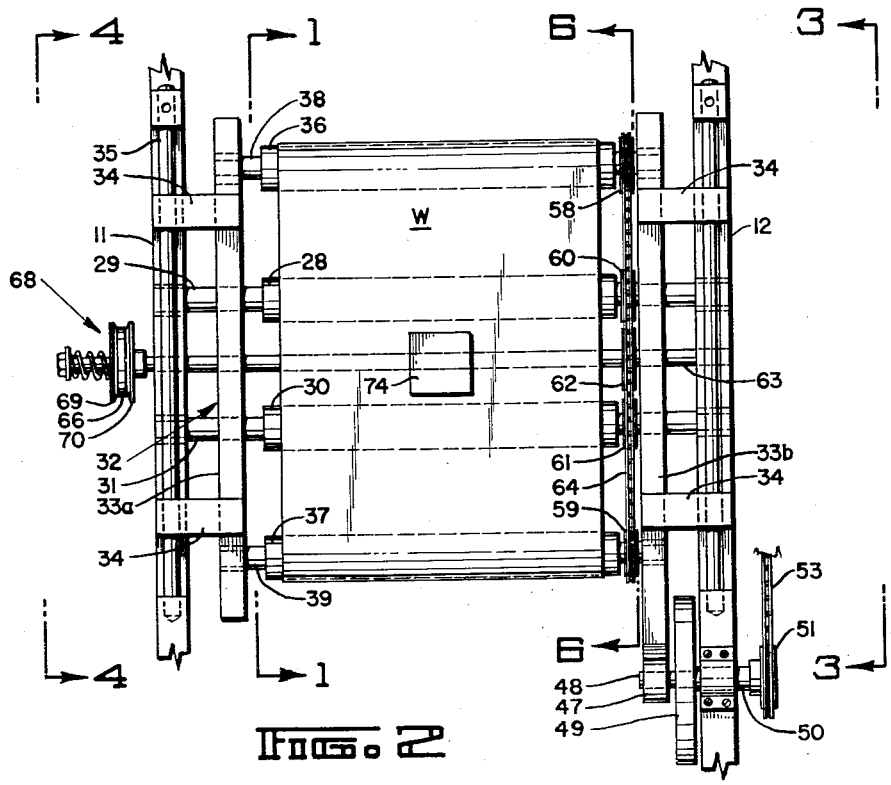
Fig. 2 is a fragmentary transverse, vertical sectional view taken along the line 2—2 of Fig. 1.
Figure 3:
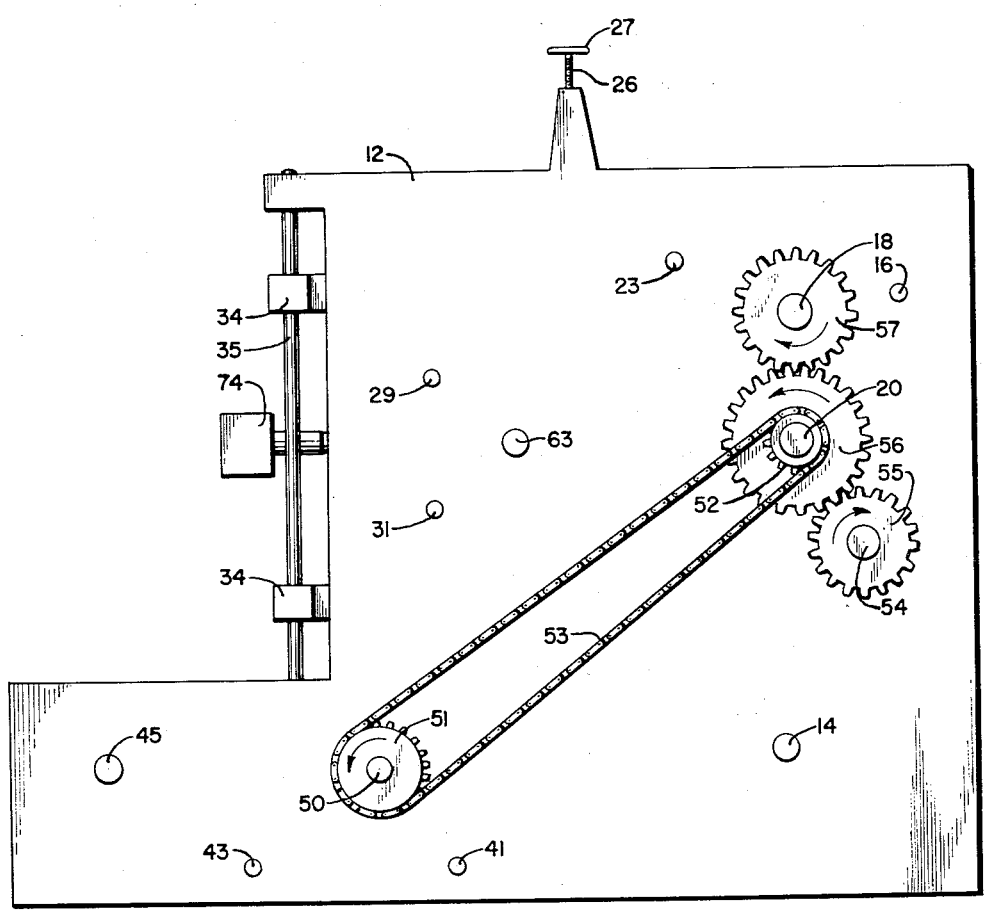
Fig. 3 is a side elevational view of the device of Fig. 1, as viewed along the line 3—3 of Fig. 2.
Figure 4:
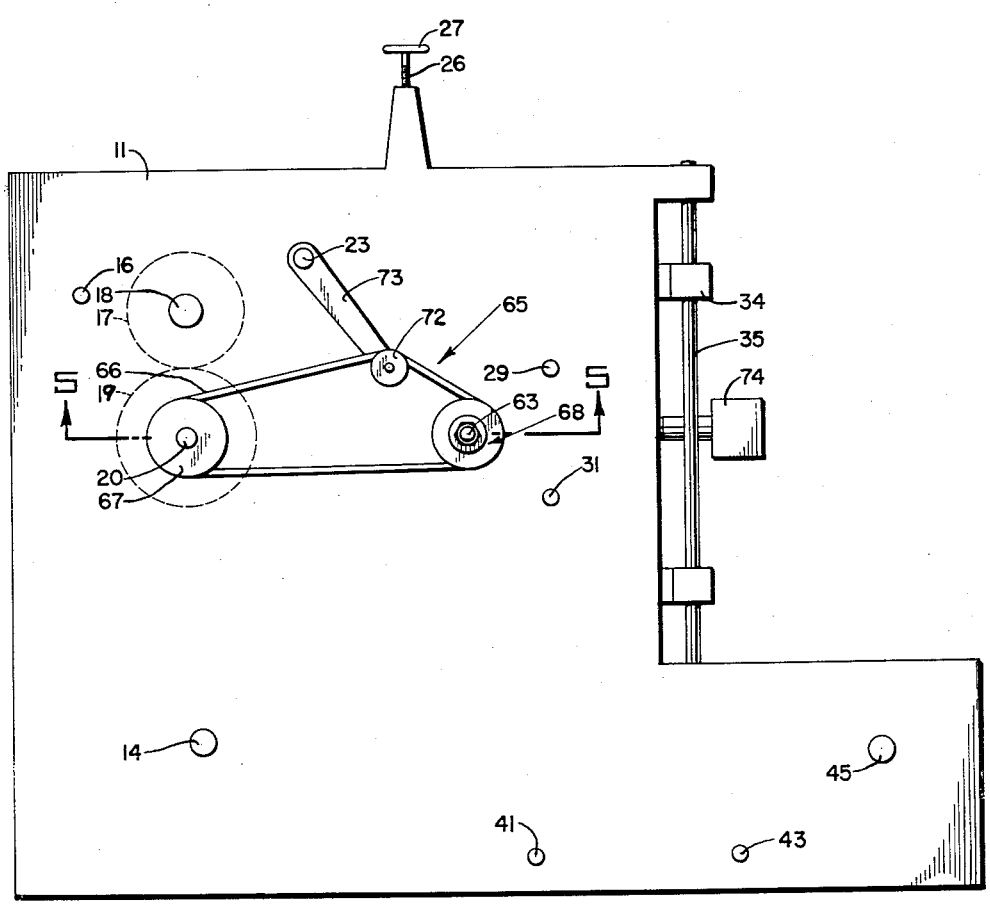
Fig. 4 is another side elevational view showing the opposite side of the device as viewed along the line 4—4 of Fig. 2.

Referring to the drawings in detail, and initially to Figs. 1 to 4, inclusive, thereof, it will be seen that the embodiment of the invention there illustrated includes a rigid frame having vertically disposed, spaced apart side frame members 11 and 12. A web W, which is to be printed or otherwise processed, is supplied in the form of an unwinding supply roll 13 disposed between side frame members 11 and 12 and having trunnions 14 at its opposite ends which are rotatably mounted in suitable bearings provided in the lower portions of the side frame members adjacent the back end of the latter. A guide roller 15 (Fig. 1) is provided with a shaft 16 which, at its opposite ends, is rotatably mounted in suitable bearings provided in the upper portions of side frame members 11 and 12 at a location above supply roll 13 (Figs. 3 and 4), and the web W passes from the supply roll over guide roller 15 (Fig. 1). An impression roll 17 is disposed in front of guide roller 15 and has a shaft 18 (Figs. 3 and 4) which, at its opposite ends, is rotatably mounted in suitable bearings provided in side frame members 11 and 12 so that the web W passes from guide roller 15 around impression roll 17 and is printed, or otherwise processed, while engaged with the surface of impression roll 17, for example, by a printing plate or the like carried by a plate cylinder 19 which is disposed below impression roll 17 and provided with trunnions 20 at its opposite ends rotatably mounted in suitable bearings provided in side frame members 11 and 12 (Figs. 3 and 4).

Figure 5:
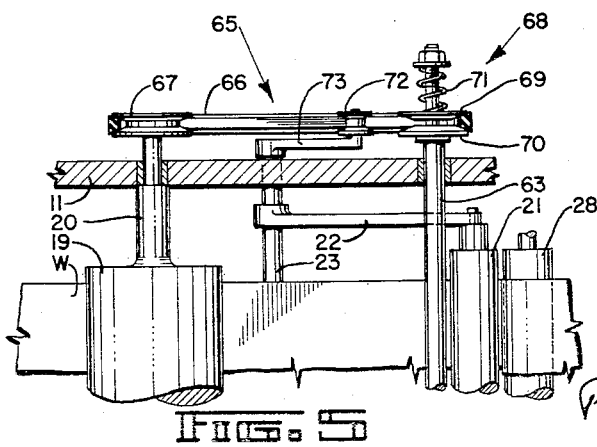
Fig. 5 is a horizontal, fragmentary sectional view taken along the line 5—5 of Fig. 4.

The printed, or otherwise processed web passes from impression roll 17 over a floating roller 21 which, at its opposite ends, is rotatably mounted in the free ends of arms 22 extending radially from a shaft 23 and fixed in relation to the latter. The opposite ends of shaft 23 are rockably journaled in side frame members 11 and 12 (Figs. 1 and 5). A cross bar 24 (Fig. 1) extends between the side frame members above arms 22, and tension springs 25 are connected, at their lower ends, to arms 22 and, at their upper ends, to spindles 26 which extend threadably through the cross bar 24 and carry hand wheels 27 by which the upward forces applied by springs 25 to arms 22, and hence to the floating roller 21, may be manually adjusted.

The web W passes downwardly from floating roller 21, and then under and around a roller 28 having a shaft 29 which, at its opposite ends, is rotatably mounted in suitable bearings provided in side frame members 11 and 12. A similar roller 30 is disposed below roller 28 (Fig. 1) and has a shaft 31 which, at its opposite ends is also rotatably mounted in suitable bearings in the side frame members (Figs. 1 and 2).

The illustrated embodiment of the invention further includes a movable structure, generally identified by the reference numeral 32 (Figs. 1 and 2), which is movable rectilinearly in opposed directions extending parallel to the plane containing the fixed axes of rotation of rollers 28 and 30. The movable structure 32 includes support members 33a and 33b which are elongated in the direction of movement thereof, that is, in the vertical direction, and are disposed adjacent the inside surfaces of side frame members 11 and 12, respectively. Each of the support members 33a and 33b is formed with lugs 34 extending forwardly and then outwardly therefrom and slidably mounted on a vertical guide bar 35 rigidly supported by the adjacent side frame member.

The movable structure 32 further includes rollers 36 and 37 having parallel shafts 38 and 39, respectively, which are rotatably mounted, at their opposite ends, in support members 33a and 33b, with the distance between the parallel axes of rotation of the rollers 36 and 37 being substantially greater than the distance between the fixed axes of rotation of rollers 28 and 30.

After passing under and around roller 28, the web W passes over and around roller 36, under and around roller 37, and then over and around roller 30. A guide roller 40 has a shaft 41 which, at its opposite ends, is rotatably mounted in suitable bearings provided in the lower portions of side frame members 11 and 12 at a location substantially below roller 30, and an additional guide roller 42 is disposed in front of guide roller 40 and similarly provided with a shaft 43 which, at its opposite ends, is rotatably mounted in suitable bearings in side frame members 11 and 12. After passing over and around roller 30, the web W is led under guide rollers 40 and 42, and then passes to a rewinding or take-up roll 44 having trunnions 45 at its opposite ends which are rotatably mounted in suitable bearings provided in side frame members 11 and 12 adjacent the forward ends of the latter.

It will be apparent that, while the web W is continuously unwound from supply roll 13 and continuously rewound on take-up roll 44, the movable structure 32 may be vertically reciprocated, as indicated by the arrows 46 (Fig. 1), without interrupting the continuous movement of the web from between the printing couple constituted by impression roll 17 and plate cylinder 19. Although vertical reciprocation of movable structure 32 does not interrupt the continuous overall movement of web W from supply roll 13 to take-up roll 44, it will be noted that vertical reciprocation of movable structure 32 serves to periodically decrease and increase the speed of movement of that portion or length L of web W between rollers 36 and 37 in relation to a fixed location or scanning station S during the upward and downward strokes, respectively, of movable structure 32. Thus, if movable structure 32 achieves a speed of movement, during its upward stroke, which is approximately equal to one-half the overall speed of movement of the web W, length L of the web will be brought to rest in relation to the scanning station S, so that an observer at such station can conveniently view the results of the printing or other operation previously performed on the web W.

The increase in the speed of movement of web W past the scanning station S during the downward stroke of movable structure 32 is made to correspond to the decrease in the speed of movement of the web relative to that fixed station effected during the upward stroke, so that the periodically increasing and decreasing speeds generally compensate for each other and do not affect the overall movement of the web from supply roll 13 to take-up roll 44.

In order to effect the desired vertical reciprocation of movable structure 32, the embodiment of the invention illustrated in Figs. 1 to 6, inclusive, of the drawings includes a scotch yoke 47 formed at the lower end of support member 33b and slidably receiving a crank pin 48 which is mounted eccentrically on a disk 49 having a central shaft 50 journaled in a suitable bearing provided in adjacent side frame member 12. Thus, as disk 49 is rotated, crank pin 48 and scotch yoke 47 cooperate to convert the rotational movement of disk 49 into vertical reciprocation of movable structure 32 which includes rollers 36 and 37.

The shaft 50 of disk 49 is driven from shaft 20 of plate cylinder 19, for example, by sprockets 51 and 52 secured on shafts 50 and 20, respectively, and an endless chain 53 running around such sprockets (Fig. 3). The rotation of plate cylinder 19 is derived from a suitably rotated drive shaft 54 which is journaled in side frame member 12 and carries a gear 55 meshing with a gear 56 secured on shaft 20. Further, impression roll 17 is positively rotated by way of a gear 57 secured on shaft 18 of the impression roll and meshing with gear 56 on the shaft of the plate cylinder.

The unwinding of web W from supply roll 13 may be effected solely by the pull exerted on the web as a result of its passing between the driven impression roll 17 and plate cylinder 19, or unwinding of supply roll 13 may be assisted by a suitable drive mechanism (not shown)

in order to prevent the development of an excessive tension in the web between the line of rolling engagement of impression roll 17 with plate cylinder 19 and the supply roll. Similarly, take-up roll 44 is suitably driven by a conventional mechanism (not shown) in order to rewind the printed or otherwise processed web following the scanning thereof at station S.

Since web W engages substantial portions of the surfaces of rollers 36 and 37, there is considerable frictional resistance to sliding of the web relative to such rollers. Thus, during upward movement of the structure 32 for decreasing the speed of movement of length L of the web past scanning station S, there will be a corresponding decrease in the rotational speed of the rollers 36 and 37 and, conversely, during downward movement of the reciprocated structure 32, which effects an increase in the speed of movement of length L of the web past station S, there will be a corresponding increase in the rotational speed of rollers 36 and 37. Since the scanning device embodying this invention is intended for use in connection with a web moving at a relatively high speed, the rollers 36 and 37 have a large inertia at the correspondingly high rotational speed thereof, and large inertial forces are developed in angularly accelerating and decelerating the rollers 36 and 37 during the vertical reciprocation of movable structure 32. In order to avoid the imposition of such inertial forces upon the web W, the scanning device embodying this invention provides a mechanical drive system for rollers 36 and 37 which functions to absorb the above mentioned inertial forces.

Figure 6:
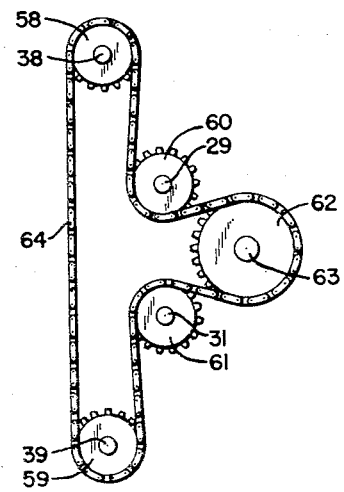
Fig. 6 is a fragmentary vertical sectional view taken along the line 6—6 of Fig. 2.

Referring to Figs. 2 and 6, it will be seen that a suitable mechanical drive system for rollers 36 and 37 may include sprockets 58 and 59 mounted on shafts 38 and 39 of the rollers 36 and 37, respectively, adjacent support member 33b, sprockets 60 and 61 mounted on shafts 29 and 31, respectively, of rollers 28 and 30, and a sprocket 62 mounted on a shaft 63 which, at its opposite ends, is rotatably journaled in suitable bearings provided in side frame members 11 and 12, with an endless chain 64 running around sprockets 58, 59, 60, 61 and 62 in order to drive rollers 28, 30, 36 and 37 in the desired directions in response to rotation of shaft 63.

As shown in Figs. 4 and 5, shaft 63 is rotatably driven from shaft 20 of plate cylinder 19 by a belt and pulley transmission 65 connected therebetween. The belt and pulley transmission 65 is designed so that rollers 28 and 30, which have fixed axes of rotation, will be turned at an angular speed sufficient to provide a linear surface speed equal to that of impression roll 17 and plate cylinder 19. Since rollers 28, 30, 36 and 37 are all interconnected by driven chain 64, the acceleration and deceleration of rollers 36 and 37 during vertical reciprocation of movable structure 32 will be effected by the chain 64 which thereby absorbs the inertial forces resulting from such acceleration and deceleration and avoids the imposition of the inertial forces on web W.

Although the interconnection of rollers 28, 30, 36 and 37 normally excludes the imposition of inertial forces on the web resulting from the periodic acceleration and deceleration of rollers 36 and 37, it is apparent that the relative length and speed conditions of the web are subject to the usual material variations imposed upon web while the latter is being processed between impression roll 17 and plate cylinder 19. Therefore, a fixed transmission ratio between shaft 20 of plate cylinder 19 and shaft 63 from which rollers 28, 30, 36 and 37 are all driven is not suitable, in that it may result in either an excesssive or insufficient tension in the web. In order to maintain a substantially constant tension in the web, the belt and pulley transmission 65 is formed as a variable speed device responsive to variations in the web tension. Thus, transmission 65 includes a V-belt 66 running around a grooved pulley 67 of fixed pitch diameter secured on an extension of shaft 20 of plate cylinder 19 and around a variable speed pulley 68 on shaft 63. Variable speed pulley 68 (Figs. 2 and 5) includes two members 69 and 70 having frusto-conical confronting surfaces to receive the V-belt 66 therebetween. The member 70 is fixed on shaft 63, while the other member 69 is axially movable toward and away from member 70, and a spring 71 is provided for urging member 69 axially toward fixed member 70. When the tension in belt 66 is increased, the belt tends to move radially inward between members 69 and 70 of variable speed pulley 68, thereby to reduce the effective pitch diameter of pulley 68 for increasing the rotational speed of shaft 63 relative to the rotational speed of shaft 20. On the other hand, when the tension in belt 66 is decreased, spring 71 urges member 69 axially toward member 70 and the belt is moved radially outward between members 69 and 70, thereby to increase the effective pitch diameter of pulley 68 for correspondingly decreasing the rotational speed of shaft 63 relative to the rotational speed of shaft 20.

In order to make the tension in belt 66 responsive to the tension in web W, the V-belt 66 is engaged by a roller 72 (Figs. 4 and 5) which is rotatably mounted on the end of an arm 73 extending radially from shaft 23 which also carries arms 22 supporting the floating roller 21. Since arms 22 and 73 are both secured to shaft 23, it is apparent that any angular displacement of arms 22 in response to changes in the tension in the web W will result in a corresponding angular displacement of arm 73, thereby to vary the force applied to belt 66 by roller 72 for correspondingly adjusting the tension in belt 66. Thus, when roller 21 moves downwardly, as viewed in Fig. 1, against the action of the springs 25 and in response to an increased tension in web W, roller 72 tends to move away from belt 66, thereby to decrease the tension in the belt and to reduce the rotational speed of shaft 63 relative to that of plate cylinder 19, in the manner previously described in detail. Such reduction in the rotational speed of shaft 63 correspondingly reduces the rotational speed of rollers 28 and 30 and thereby decreases the tension in web W. On the other hand, when springs 25 effect upward movement of roller 21 in response to a decrease in tension in web W, roller 72 effects a corresponding increase in the tension in belt 66 thereby to increase the rotational speed of shaft 63 and to similarly increase the rotational speed of rollers 28 and 30 for increasing the tension in web W. Thus, the tension in web W will tend to remain near a predetermined value which can be adjusted by manipulation of the hand wheels 27 controlling the tension in related springs 25.

It will be apparent that the connection between rotated shaft 50 and vertically movable structure 32 provided by the cooperating crank pin 48 and scotch yoke 47 imparts a rapid harmonic motion to structure 32. The radial distance from eccentric crank pin 48 to the axis of disk 49 and the proportions of the drive mechanism between shafts 20 and 50, constituted by sprockets 51 and 52 and chain 53, are selected so that length L of the web attains a speed relative to the fixed station S which is twice as great as the constant linear surface speed of plate cylinder 19 during the downward stroke of structure 32; whereas, during the upward stroke of structure 32, the speed of length L of the web relative to the fixed station is reduced to zero. While this change from double speed to zero speed occurs in a harmonic motion pattern, as determined by the disclosed scotch yoke mechanism, it should be realized that the proportions and ratios of the described drive mechanism may be selected so that a slight negative or upward motion of length L of the web in relation to fixed station S is obtained during the upward stroke of structure 32, thereby to prolong the period during which the length L of the web is immobile or only slowly movable relative to station S so that it can be closely observed. Such a negative or upward motion of the web relative to the fixed station during the upward stroke of structure 32 will obviously be accompanied by a speed of web movement during the downward stroke which is more than twice that of the linear surface speed of plate cylinder 19. It should also be realized that the frequency of the reciprocating motion imparted to structure 32 and the length of its reciprocating stroke, as determined by the eccentricity of crank pin 48 relative to the axis of rotation of disk 49, may be proportioned so that a single revolution of disk 49 can occur during several rotations of plate cylinder 19. Such reduction in the relative frequency of reciprocating movement imparted to structure 32 has the effect of prolonging the duration of each inspection period, that is, the time during which a length L of the web can be conveniently observed at scanning station S.

It will be apparent that mechanisms other than the cooperating scotch yoke and crank pin described above may be employed for effecting vertical reciprocation of movable structure 32. Thus, as shown in Fig. 7, a radical cam 49' may be mounted on shaft 50 in place of disk 49 and its crank pin 48 and is engaged by a follower 47' which replaces scotch yoke 47 at the lower end of support member 33b, so that, as shaft 50 is rotated, cam 49' engaged by follower 47' produces the desired vertical reciprocation of structure 32. The cam and follower arrangement of Fig. 7 has the advantage of permitting design of the contour of cam 49' to provide a longer period during which length L of the web will be in an observable position at scanning station S.

Another mechanical arrangement suitable to be substituted for the cooperating scotch yoke and crank pin of the first described embodiment of the invention is shown in Figs. 8 and 9 of the drawings and includes a stationary internal gear 74 fixed to the side frame member 12 concentric with the rotated shaft 50, and a pinion 75 meshing with the internal teeth of gear 74. Pinion 75 is mounted on a shaft 76 which is rotatably supported at the free end of a crank 77 extending radially from shaft 50. Pinion 75 has a pitch radius equal to one-half the pitch radius of internal gear 74, and the radial distance between the parallel axes of shafts 50 and 76 is equal to the pitch radius of pinion 75 so that, as shaft 50 is rotated, pinion 75 rolls within internal gear 74 in meshing engagement with the latter and thereby forms an epicyclic gear train.

A link 78 is mounted, at one end, on shaft 76 and, at its other end, is rotatably connected to a pivot 79 at the lower end of support member 33b. Link 78 is fixed with respect to pinion 75 by a pin 80 so that link 78 rotates with pinion 75 about the shaft 76 of the latter. The length of link 78 between the parallel axes of shaft 76 and pivot 79 is also equal to the pitch radius of pinion 75 so that, as the latter rolls within internal gear 74, pivot 79 has a rectilinear, reciprocating motion imparted thereto for transmission to structure 32.

Further, although the length L of the web may be directly viewed with the naked eye at scanning station S, a suitable optical viewing device, as indicated generally at 74 (Figs. 1, 3 and 4), may be suitably supported at station S to provide an enlarged view of the web.

Although illustrative embodiments of the invention have been described in detail herein with reference to the accompanying drawings, it is to be understood that the invention is not limited to those particular embodiments, and that various changes and modifications may be effected therein without departing from the scope or spirit of the invention, except as defined in the appended claims.

What is claimed is:

1. In a machine including means for continuously feeding a web from a supply thereof to a recipient of the web and a rotary printing couple acting continuously on the web at a constant rotational speed as the web is so fed; a device for permitting direct scanning of the web beyond said printing couple during the continuous feeding of the web, comprising two spaced apart rotatable rollers around and between which the web extends to form a flight of constant length passing a fixed scanning station, means for reciprocating said rollers together in a path along the direction in which said flight extends to alternately increase and decrease the speed of movement of the web flight in relation to said fixed station so that, in each period of such decreased speed, the web in said flight can be directly viewed from said fixed station, means positively driving said rollers in synchronism with the continuous feeding of the web and responding to the reciprocation of the rollers for varying the rotational speeds of the latter in accordance with such reciprocation, thereby to avoid the imparting of inertial forces from said rollers to the web during the alternate increase and decrease of the speed of movement of the web in said flight, and variable transmission means connected to said means positively driving the rollers and responding to fluctuations of the tension in the web approaching said rollers to vary the speed of said driving means so as to maintain substantially constant tension in the web.

2. In a machine including means for continuously feeding a web from a supply thereof to a recipient of the web; a device for permitting direct scanning of the web during the continuous feeding thereof, comprising two spaced apart rotatable rollers around and between which the web extends to form a flight of constant length passing a fixed scanning station; means for reciprocating said rollers together in a path along a direction in which said flight extends to alternately increase and decrease the speed of movement of the web flight in relation to said fixed station so that, in each period of such decreased speed, the web in said flight can be directly viewed from said fixed station; means positively driving said rollers in synchronism with the continuous feeding of the web and responding to the reciprocation of said rollers for varying rotational speeds of the latter in accordance with such reciprocation; said driving means including variable speed transmission means comprising a driving pulley operated in synchronism with said web feeding means, a driven pulley and a belt running around said driving pulley and said driven pulley, said driven pulley having a variable pitch diameter depending upon the tension in said belt; and control means for said variable speed transmission including a floating roller engaging a portion of the web approaching said two rollers, means urging said floating roller against said web portion with a predetermined force so that as the tension in said web portion varies said web portion and said floating roller are displaced, a tensioning roller continuously engaging a flight of said belt, means urging said tensioning roller against said belt flight with a predetermined force to tension said belt flight, and means for displacing said tensioning roller in predetermined relation to any displacement of said floating roller to vary the tension in said belt, whereby the pitch diameter of said driven pulley is varied correspondingly to change the speed of said driving means and thus restore the desired tension in said web portion.

3. In a machine including means for continuously feeding a web from a supply thereof to a recipient of the web; a device for permitting direct scanning of the web during the continuous feeding thereof, comprising two spaced apart rotatable rollers around and between which the web extends to form a flight of constant length passing a fixed scanning station; means for reciprocating said rollers together in a path along a direction in which said flight extends to alternately increase and decrease the speed of movement of the web flight in relation to said fixed station so that, in each period of such decreased speed, the web in said flight can be directly viewed from said fixed station; means positively driving said rollers in synchronism with the continuous feeding of the web and responding to the reciprocation of said rollers for varying rotational speeds of the latter in accordance with such reciprocation; said driving means including variable speed transmission means comprising a driving pulley operated in synchronism with said web feeding means, a driven pulley and a belt running around said driving pulley and said driven pulley, said driven pulley having a variable pitch diameter depending upon the tension in said belt; and control means including a floating roller engaging a portion of the web approaching said two rollers, a tensioning roller continuously engaging a flight of said belt, means mounting and interconnecting said floating roller and said tensioning roller for movement in unison and yieldable means acting upon said interconnecting means with a predetermined force to urge said floating roller against said web portion with a predetermined force and to urge said tensioning roller against said belt flight, said floating roller being displaced upon variation of the tension in said web portion and said tensioning roller being displaced in predetermined relation to the displacement of said floating roller to vary the tension in said belt, whereby the pitch diameter of said driven pulley is varied to change the speed of said driving means and thus restore the desired tension in said web portion.

4. In a machine including means for continuously feeding a web from a supply thereof to a recipient of the web; a device for permitting direct scanning of the web during the continuous feeding thereof, comprising two spaced apart rotatable rollers around and between which the web extends to form a flight of constant length passing a fixed scanning station; means for reciprocating said rollers together in a path along a direction in which said flight extends to alternately increase and decrease the speed of movement of the web flight in relation to said fixed station so that, in each period of such decreased speed, the web in said flight can be directly viewed from said fixed station; means positively driving said rollers in synchronism with the continuous feeding of the web and responding to the reciprocation of said rollers for varying rotational speeds of the latter in accordance with such reciprocation; said driving means including variable speed transmission means comprising a driving pulley operated in synchronism with said web feeding means, a driven pulley and a belt running around said driving pulley and said driven pulley, said driven pulley having a variable pitch diameter depending upon the tension in said belt; and control means for said variable speed transmission including a floating roller engaging a portion of the web approaching said two rollers, means urging said floating roller against said web portion with a predetermined force so that as the tension in said web portion varies said web portion and said floating roller are displaced, a tensioning roller continuously engaging a flight of said belt, means urging said tensioning roller against said belt flight with a predetermined force to tension said belt flight, means for displacing said tensioning roller in predetermined relation to displacement of said floating roller to vary the tension in said belt, whereby the pitch diameter of said driven pulley is varied correspondingly to change the speed of said driving means and thus restore the desired tension in said web portion, and means associated with said means urging said floating roller against said web portion for adjusting the force of said floating roller against said web portion to any desired value, whereby to vary the tension maintained in said web.

5. In a machine including means for continuously feeding a web from a supply thereof to a recipient of the web; a device for permitting direct scanning of the web during the continuous feeding thereof, comprising two spaced apart rotatable rollers around and between which the web extends to form a flight of constant length passing a fixed scanning station; means for reciprocating said rollers together in a path along a direction in which said flight extends to alternately increase and decrease the speed of movement of the web flight in relation to said fixed station so that, in each period of such decreased speed, the web in said flight can be directly viewed from said fixed station; means positively driving said rollers in synchronism with the continuous feeding of the web and responding to the reciprocation of said rollers for varying rotational speeds of the latter in accordance with such reciprocation; said driving means including variable speed transmission means comprising a driving pulley mounted on a shaft carrying a rotary drive element of said web feeding means, a driven pulley, a belt running around said driving pulley and said driven pulley, said driven pulley having a variable pitch diameter and including means biasing said driven pulley toward its maximum effective diameter against the tension in said belt; and control means for said variable speed transmission comprising a rockable shaft carrying two radial arms, a floating roller mounted on one of said arms to engage continuously a portion of said web approaching said two rollers, a tensioning roller mounted on the other of said arms to engage continuously a flight of said belt, spring means acting upon at least one of said arms with a predetermined force to urge said floating roller yieldably against said web portion and to urge said tensioning roller against said belt flight to control the tension in said belt and the pitch diameter of said driven pulley, whereby upon variation of the tension in said web portion the pitch diameter of said driven pulley is varied to change the speed of said driving means and thus restore the desired tension in said web portion.

References Cited in the file of this patent

UNITED STATES PATENTS

| | | |
|---|---|---|
| 1,545,638 | Clay | July 14, 1925 |
| 1,905,446 | Dewey et al. | Apr. 25, 1933 |
| 2,655,212 | Stewart | Oct. 13, 1953 |
| 2,667,924 | Dutro | Feb. 2, 1954 |
| 2,787,463 | Huck | Apr. 2, 1957 |